United States Patent [19]

Humpert

[11] 4,349,149
[45] Sep. 14, 1982

[54] MIXING VALVE

[75] Inventor: Jürgen Humpert, Hemer, Fed. Rep. of Germany

[73] Assignee: Friedrich Grohe Armaturenfabrik GmbH & Co., Hemer, Fed. Rep. of Germany

[21] Appl. No.: 167,381

[22] Filed: Jul. 9, 1980

[30] Foreign Application Priority Data

Jul. 13, 1979 [DE] Fed. Rep. of Germany ....... 2928330

[51] Int. Cl.³ ............................................. G05D 23/13
[52] U.S. Cl. ................................. 236/12 R; 137/100
[58] Field of Search ..................... 236/12.16; 137/605, 137/625.18, 100

[56] References Cited

U.S. PATENT DOCUMENTS

| 2,199,129 | 4/1940 | Hamilton | 236/12.16 |
| 2,682,276 | 6/1954 | Fraser | 137/100 |
| 2,800,137 | 7/1957 | Fraser | 137/100 |
| 2,923,478 | 2/1960 | Di Giulio | 236/12.16 |
| 2,959,330 | 11/1960 | Charbonneau | 137/625.18 X |
| 3,090,559 | 5/1963 | Bayer | 236/12.16 |
| 3,099,996 | 8/1963 | Symmons | 137/100 X |
| 3,144,048 | 8/1964 | Acker et al. | 137/605 X |

Primary Examiner—William E. Tapolcai, Jr.
Attorney, Agent, or Firm—James B. Raden; Donald J. Lenkszus

[57] ABSTRACT

A mixing valve is provided with modular self contained units for controlling the volume, controlling mixtures ratio, and providing pressure balancing. Each unit may be separately replaced.

6 Claims, 4 Drawing Figures

MIXING VALVE

BACKGROUND OF THE INVENTION

The invention relates to a mixing valve for mixing cold and hot water and metering the volume of mixed water with a device for adjusting the mixing ratio and a device for adjusting the outlet volume.

In a mixing valve described in German Pat. No. 20 14 552, the shut-off valves are each arranged in separate bores adjacent to a central bore which receives a mixture control device. In that valve arrangement the casing is of relatively large dimensions.

It is one object of the invention to simplify the design of the mixing valve casing. It is another object of the invention to design the mixing valve so that different control and/or by-pass units can be fitted in the mixing valve casing as basic items.

SUMMARY OF THE INVENTION

A valve in accordance with the invention includes a valve body having a central bore into which various control capsules may be installed. A volume control capsule can be fitted upstream in the through bore, for synchronously controlling the volume of flow of cold and hot water. A pressure balancing unit designed optionally as a component for the inflowing cold and hot water or as a suitable by-pass element or adapter can then be fitted in line in the direction of flow of the water. At the downstream end of the through bore, a mixture control unit is fitted which is designed as a component which can either incorporate a temperature controlled mixing device or a controllable mixing device.

This has the particular advantage that even in the case of installed mixing valves, all the units can be exchanged or replaced, so that with a mixing valve according to this invention accurate mixed water temperature can be met, even with the installed valve, by removing or adding individual units. Furthermore, the design of the various units as self-contained components offers the possibility of separately fitting and storing them, which enables the units to be installed optionally and straightforwardly, for example, during the final assembly of the various kinds of valve.

BRIEF DESCRIPTION OF THE DRAWINGS

The invention may be better understood from a reading of the following detailed description in conjunction with the drawings in which like reference numerals designate like elements and in which:

FIG. 1a is a plan view of the valve discs of the shut-off unit of FIG. 1;

DETAILED DESCRIPTION

Figure 1:
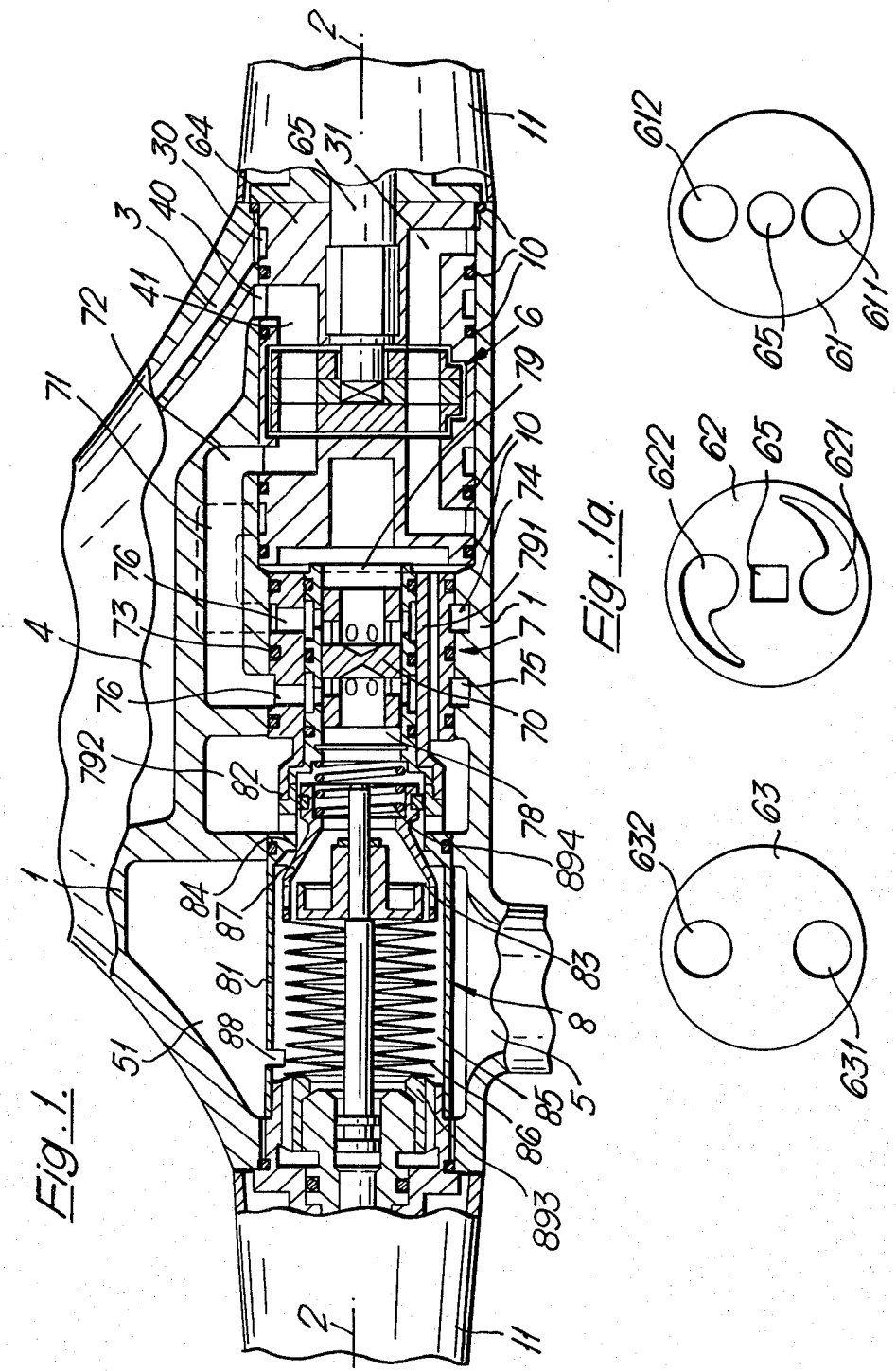
FIG. 1 is a partial cross-section of a mixing valve incorporating shut-off unit, pressure balancing unit and water mixture control unit.

The mixing valve of FIG. 1 includes a valve casing 1, incorporating an inlet passage 3 for cold water and an inlet passage 4 for hot water and at least one outlet passage 5 for the mixed water. The mounting arrangements of the mixing valve and the other outlet are not shown in detail on the drawing and may be designed in accordance with well known engineering practice.

Between the inlet passages 3,4, and the outlet passage 5 a through bore is arranged in the valve casing 1 at right angles to the passages on an axis 2. Upstream, a shut-off device 6 is first fitted in the through bore by means of which the separately supplied cold and hot water can be synchronously adjusted for volume of water flow. The shut off device 6 includes a body 64 tightly held in the through bore in which, transversely to the axis 2, an inflow disc 61, an outflow disc 63 and a control disc 62 mounted between the discs 61, 63. The control disc 62 can be rotated by means of a spindle 65 and a knob 11. The inflow and outflow discs 61, 63 cannot be rotated. The discs 61, 62, 63 may be of a wear resistant material such as carbide or oxide ceramics. The inlet passages 3 and 4 have a rotatable annular passage 30, 40 in the region of the through bore which is sealed off by the O rings 10. The cold water is supplied to the body 64 in a passage 31 in the body 64 and supplied to the inlet disc 61 through a separate hole 611 passing through the control port 621 into the hole 631 of the outflow disc 63 and from there it passes into the downstream part of the passage 31 into a further annular passage sealed off by O rings 10 into a supply passage 71 in the valve casing 1 and then to a pressure balancing control device 7 which may be of a type known in the art. The hot water is supplied parallel to the cold water in a passage 41 and returned through the diametrally arranged holes 612, 622 and 632 into a supply passage 72 in the valve casing and is separately fed to the pressure balancing control device.

The pressure balancing control device 7 is also provided with a cylindrical body 73 which is tightly fitted in the slightly reduced diameter of the through bore and in contact with the body 64. The cold and hot water pass through annular passages 74 and 75 separated from each other by radial holes 76 into the pressure balancing device. The pressure balancing device includes a piston 70 for balancing the pressure of the two media. After balancing, the hot water flows coaxially out of the piston 70 into a chamber 78 and from there passes on to a mixture control unit. The pressure adjusted cold water passes into a chamber 79 from where it flows through coaxial holes 791 into a chamber 792 to be passed on into the mixture control unit.

A thermostatically controlled water mixing device 8 is tightly fitted in the last section of the through bore.

The complete control unit is thus assembled within a tubular sleeve 81. For this purpose, the tubular sleeve 81 can, for example, be connected to the body 73 for the pressure balancing control device 7 with a screw thread 82. The hot water is thus able to flow coaxially from the chamber 78 through a hot water valve seat 83, and the cold water from the chamber 792 through the cold water valve seat 84 into the mixing chamber 85, which is enclosed by the tubular sleeve 81. A temperature sensitive body 86 is positioned in chamber 85 by means of a knob 11. The temperature sensitive body 86 may be of any type known in the art such as the composite bimetallic thermostatic element shown which has been described in U.S. Pat. No. 3,090,559. A mixed water temperature can be preselected by knob 11. The temperature sensitive body 86 includes coaxial dished bimetallic springs, the left most one being arranged adjacent an abutment means shown as a plug or compression member 893. The rightmost spring is adjacent the left end of bell shaped valve 87 as shown. Helical spring 894 biases the valve 87 against the temperature sensitive body 86. The actual mixed water temperature in the mixing chamber acts on the temperature sensitive body 86 which in turn will expand or contract moving bell-shaped valve 87 in the event of temperature deviations from the preselected temperature. The temperature controlled mixed water then flows through slots 88, through a mixed water chamber 51, and into the outlet passage 5.

Figure 2:
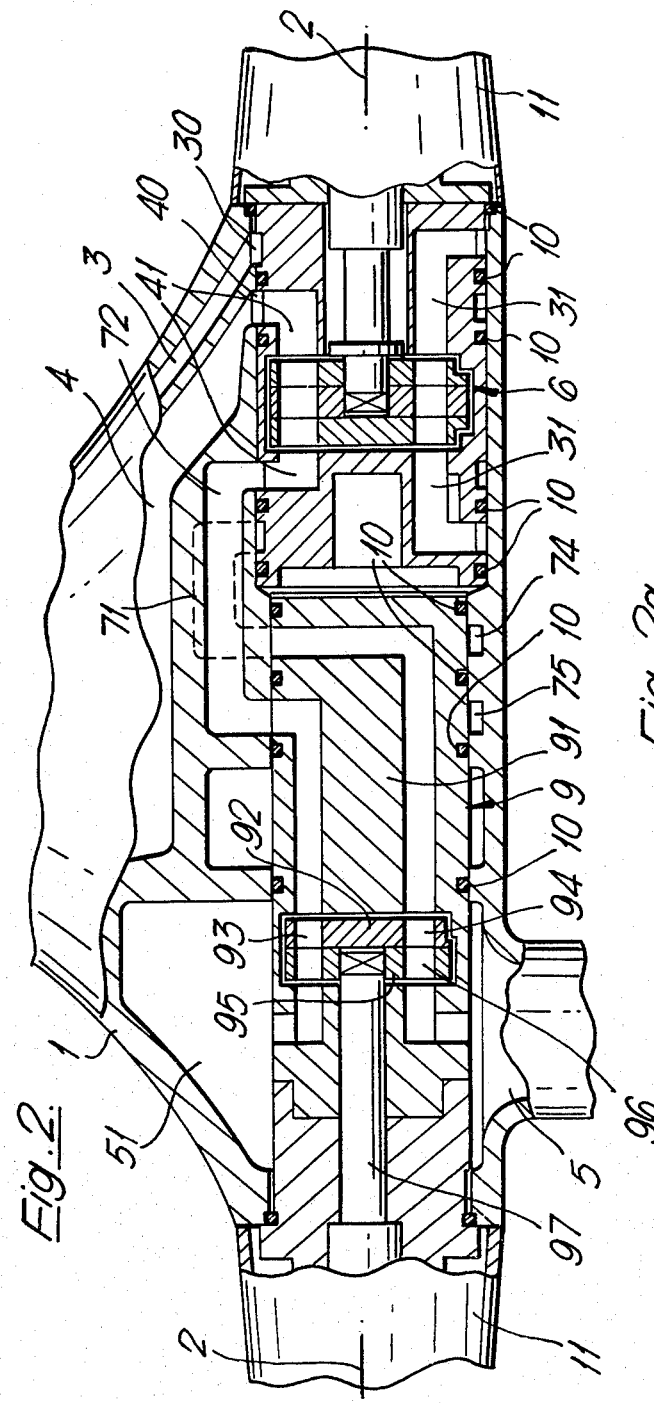
FIG. 2 is a partial cross-section of a mixing valve with a by-pass element for the pressure balancing device and a unit for controlling the mixture.
Figure 2A:
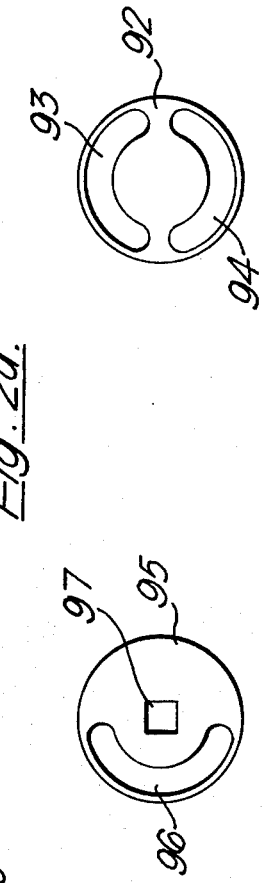
FIG. 2a is a plan view of two control discs of the mixture control unit.

FIG. 2 shows the same valve casing 1 with a control device 9 for mixing cold and hot water. The same device is also used upstream as a shut-off device. Further downstream, however, the control device 9 is provided for the mixed water generation instead of the two regulating devices. The cold and hot water, radially separated, are supplied through the two supply passages 71, 72 to a body 91 incorporating the control device in one unit which is sealed by O rings 10. Two discs which can be rotated relative to each other are fitted in the body 91 at right angles to the axis 2. A first disc 92 is fixed non-rotatably in the body and provided with flow ports 94 for the cold water and 93 for the hot water which are curved for slightly less than 180° and are disposed diametrally and connected to the annular passages 74,75 with corresponding passages in the body 91. A control disc 95 is fitted rotatably against the disc 92 by means of a spindle 97 and control knob 11. In contrast to disc 92, the control disc 95 has only one curved control slot 96 which covers about half the circumference of the disc. Consequently, according to the setting of the control disc 95 relative to the disc 92, the control slot can be moved so that it more or less covers the slots 94 and 93, so that depending on the rotary position of the control disc 95, the mixture of the two inflowing media can be controlled.

Of course the disc 92 may also be omitted with a suitably fixed design of the body 91, and the slots 94,93 for the cold and hot water be arranged in a suitably designed end face in the body against which only the control disc is then fitted.

Each control device can of course be designed so that their external dimensions correspond to the thermostatically controlled water mixing device 8, and a suitable by-pass unit, dummy piece or adapter can be provided for the pressure balancing device 7, so that, by this arrangement, the mixing valve can be constructed with or without pressure balancing control unit 7 and a thermostatically controlled water mixing device 8, and can be provided with or without pressure balancing control device 7 and a control device 9 for the mixing of cold and hot water.

What is claimed is:

1. A mixing valve for mixing hot and cold water comprising:

a valve body having a first passage in communication with a hot water sources, a second passage in communication with a cold water source, a central core positioned transverse to at least one of said first and second passages;

a synchronously acting volume control device positioned in said bore; and at least one mixture control device for controlling the mixture of said hot and cold water positioned downstream of said volume control device, said volume control device comprising a cylindrical cartridge adapted to be inserted into said bore, said cartridge containing:

an inlet disc having a pair of diametrically opposing holes, an outlet disc having a pair of diametrically opposing holes each of which is in alignment with a corresponding one of said holes of said inlet disc, said inlet and outlet discs being mounted in said cartridge transverse to the axis of said cartridge and so as to prevent rotational movement, third and fourth flow passages each in respective communication between one of said first and second passages and one of said inlet disc pair of holes, and a control disc rotatably mounted intermediate said inlet and outlet discs and having a pair of diagonally disposed control ports;

said control disc being rotatable to place said pair of control ports in fluid communication between said inlet and outlet disc pairs of holes;

said valve comprising a spindle coaxial to said axis and coupled to said control disc for rotational movement thereof.

2. A mixing valve in accordance with claim 1 wherein said mixture control device comprises a thermostatically controlled mixing device.

3. A mixing valve in accordance with claim 2 comprising a pressure balancing control device connected to said mixture control device and in line with said volume control device.

4. A mixing valve in accordance with claims 1 or 2 wherein said mixture control device comprises a cartridge containing a mixing valve, said cartridge adapted to be mounted in said bore.

5. Mixing valve according to claim 1 or 4, comprising a pressure balancing control device for the mutual adjustment of the pressures of the supplied cold and hot water, said pressure balancing control device comprising a cartridge containing a pressure balancing valve, said pressure balancing cartridge adapted to be mounted in said bore, in line with the shut-off device and coupled to said mixture control device.

6. Mixing valve according to claim 4, comprising a cylindrical member adapted to be inserted in said bore intermediate said volume control device and said mixture control device and including flow passages in fluid communication with said outlet disc holes and said mixture control device.

* * * * *